United States Patent
Kuraki et al.

(10) Patent No.: US 10,325,338 B2
(45) Date of Patent: Jun. 18, 2019

(54) INFORMATION EMBEDDING DEVICE, INFORMATION DETECTING DEVICE, INFORMATION EMBEDDING METHOD, AND INFORMATION DETECTING METHOD

(71) Applicant: FUJITSU LIMITED, Kawasaki-shi, Kanagawa (JP)

(72) Inventors: Kensuke Kuraki, Ichikawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/667,240

(22) Filed: Aug. 2, 2017

(65) Prior Publication Data

US 2017/0330301 A1    Nov. 16, 2017

Related U.S. Application Data

(62) Division of application No. 14/508,351, filed on Oct. 7, 2014, now Pat. No. 9,760,965.

(30) Foreign Application Priority Data

Nov. 29, 2013  (JP) .................................. 2013-248591

(51) Int. Cl.
   *G06K 9/00* (2006.01)
   *G06T 1/00* (2006.01)

(52) U.S. Cl.
   CPC ............ *G06T 1/005* (2013.01); *G06T 1/0021* (2013.01); *G06T 1/0064* (2013.01); *G06T 1/0085* (2013.01); *G06T 2201/0052* (2013.01); *G06T 2201/0061* (2013.01); *G06T 2201/0065* (2013.01); *G06T 2201/0601* (2013.01)

(58) Field of Classification Search
   None
   See application file for complete search history.

(56) References Cited

U.S. PATENT DOCUMENTS

| | | |
|---|---|---|
| 7,018,045 B2 | 3/2006 | Tomita |
| 7,769,197 B2 | 8/2010 | Fujii et al. |
| 7,840,005 B2 | 11/2010 | Delp |
| 7,844,072 B2 | 11/2010 | Van Leest |
| 7,970,164 B2 | 6/2011 | Nakamura et al. |
| 8,126,202 B2 | 2/2012 | Nakamura et al. |
| 8,582,900 B2 | 11/2013 | Nakagata et al. |
| 8,712,094 B2 | 4/2014 | Anan et al. |
| 8,861,781 B2 | 10/2014 | Kuraki et al. |

(Continued)

FOREIGN PATENT DOCUMENTS

| | | |
|---|---|---|
| JP | 2005-182164 | 7/2005 |
| JP | 2005-277732 | 10/2005 |

(Continued)

OTHER PUBLICATIONS

Nakagata et al., WO2012/127611, published Sep. 2012.*

(Continued)

*Primary Examiner* — Soo Jin Park
(74) *Attorney, Agent, or Firm* — Fujitsu Patent Center

(57) ABSTRACT

A memory stores first video information displayed on a display screen. A processor generates embedded information varying temporally and superimposes the embedded information on an image part at least corresponding to an edge of the display screen in the first video information so as to generate second video information on which the embedded information is superimposed. An output interface outputs the second video information.

5 Claims, 21 Drawing Sheets

(56) References Cited

U.S. PATENT DOCUMENTS

| | | | |
|---|---|---|---|
| 8,942,413 B2 | 1/2015 | Anan et al. | |
| 9,582,842 B2* | 2/2017 | Nakagata | H04N 19/467 |
| 9,607,348 B2* | 3/2017 | Nakagata | H04N 19/467 |
| 2002/0168069 A1 | 11/2002 | Tehranchi | |
| 2004/0027601 A1 | 2/2004 | Ito | |
| 2008/0273741 A1 | 11/2008 | Fujii et al. | |
| 2012/0163583 A1 | 6/2012 | Nakagata | |
| 2012/0163653 A1 | 6/2012 | Anan et al. | |
| 2013/0028465 A1 | 1/2013 | Kuraki et al. | |
| 2014/0016817 A1* | 1/2014 | Nakagata | H04N 19/467 |
| | | | 382/100 |

FOREIGN PATENT DOCUMENTS

| | | |
|---|---|---|
| JP | 2006-318099 | 11/2006 |
| JP | 2010-232886 | 10/2010 |
| JP | 2011-239433 | 6/2011 |
| JP | 2011-142607 | 7/2011 |
| JP | 2012-142741 | 7/2012 |
| JP | 2013-30974 | 2/2013 |
| WO | 2004066626 | 8/2004 |
| WO | 2007015452 | 2/2007 |

OTHER PUBLICATIONS

JPOA dated Feb. 21, 2017 for corresponding Japanese Application No. 2013-248591, with English translation.

USPTO, (PARK) Notice of Allowance and Notice of Allowability, dated Jun. 5, 2017, in parent U.S. Appl. No. 14/508,351 [allowed].

USPTO, (PARK) Non-Final Rejection, dated Mar. 1, 2017, in parent U.S. Appl. No. 14/508,351 [allowed].

USPTO, (PARK) Restriction Requirement, dated Jan. 20, 2017, in parent U.S. Appl. No. 14/508,351 [allowed].

* cited by examiner

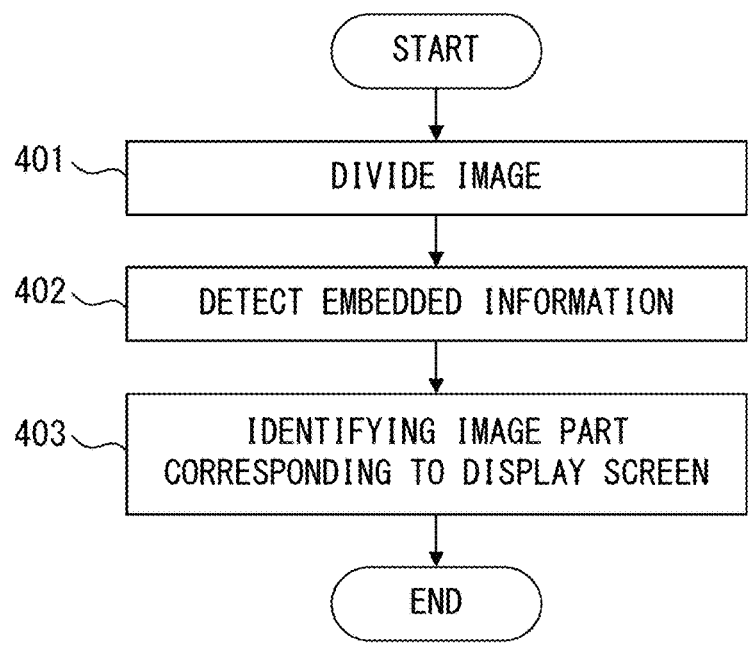
F I G. 4

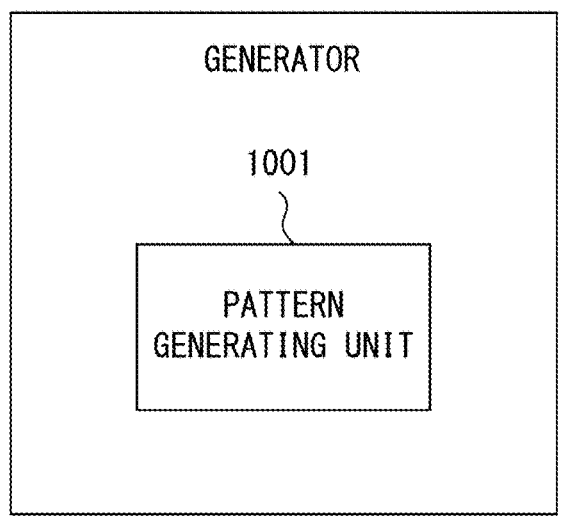
F I G. 17

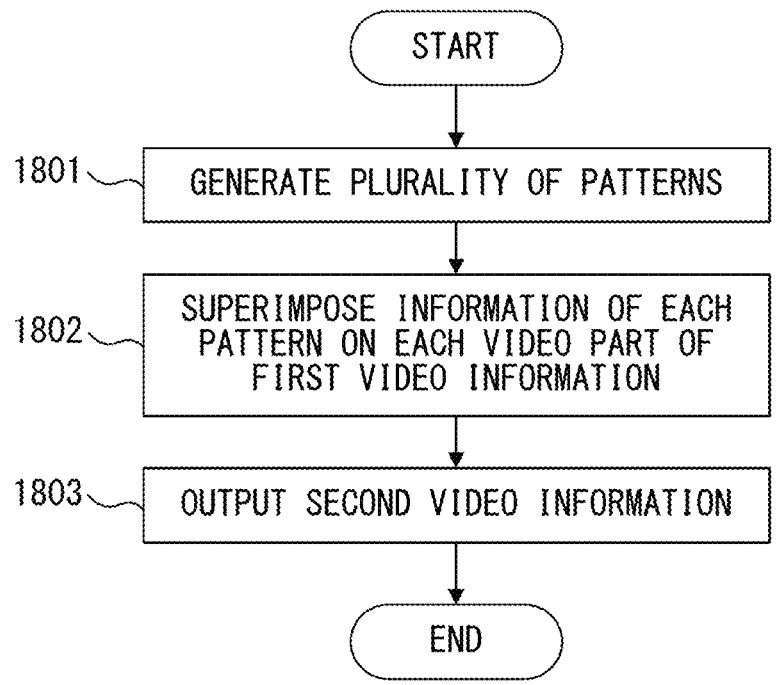
F I G. 18

INFORMATION EMBEDDING DEVICE, INFORMATION DETECTING DEVICE, INFORMATION EMBEDDING METHOD, AND INFORMATION DETECTING METHOD

CROSS-REFERENCE TO RELATED APPLICATION

This application is a divisional of application Ser. No. 14/508,351, filed Oct. 7, 2014, which is based upon and claims the benefit of priority of the prior Japanese Patent Application No. 2013-248591, filed on Nov. 29, 2013, the entire contents of which are incorporated herein by reference.

FIELD

The embodiments discussed herein relate to an information embedding device, an information detecting device, an information embedding method, and an information detecting method.

BACKGROUND

In recent years, businesses such as Online to Offline (O2O) have been surging in which, through video or audio on a display screen of a television set or digital signage terminal, information related to the video or audio contents is distributed.

For example, the distribution of information through video enables users to obtain the content-related information by imaging video with a smart device such as a smartphone or tablet. The distribution of information through audio enables users to obtain the content-related information by recording audio with a smart device. Such business leads users to an online service or real shop through video or audio.

Technologies such as a video or audio recognition technology and a digital watermark technology which embeds other information in video or audio in a form which is hard to be perceived by humans are often used in order to realize such businesses. According to the video recognition technology, recognition with a higher accuracy can be obtained in less time because more feature amounts can be used in the case of video than audio which is a one-dimensional signal. According to the digital video watermark technology, more information can be embedded in less time in the case of video than audio.

From this point of view, the technology using video is more advantageous than that using audio. On the other hand, differently from audio, video causes a spatial distortion depending on a positional relationship between an imaging device and a display screen as a subject, and the distortion results in reduced accuracy of video recognition and of digital watermark detection. Thus, it is preferable that the spatial distortion be corrected by preprocessing.

With respect to preprocessing, a method for detecting points of four corners to correct a rectangular image of printed materials captured with a camera is known (see Patent Document 1, for example). According to this method, an edge is detected when a weighted sum of brightness adjacent to a point of interest of the rectangular image exceeds an edge determining threshold. A frame is detected when a weighted sum obtained from a proximity point range of the rectangular image, an optimal range width of proximity points, and the number of columns of a weighting factor matrix exceed a frame determining threshold. The coordinates of the four corners are then detected on the basis of the detected edge or frame.

With respect to preprocessing, a method for determining an image area to extract an original image area from an acquired image is also known (see Patent Document 2, for example). According to this method for determining an image area, end points of an edge line in the original image area included in the acquired image are obtained as a tentative vertex, the Fourier transform process is performed on the images around the tentative vertexes, and a phase angle of a low-frequency component is calculated. The misalignment of the tentative vertexes is adjusted on the basis of the calculated phase angle to obtain final detected vertexes, and the original image area is extracted on the basis of the coordinate values of the final detected vertexes.

A digital watermark embedding device which embeds watermark information in moving image data without deteriorating an image quality of moving image data is also known (see Patent Document 3, for example). This digital watermark embedding device periodically varies an area of watermark patterns superimposed on each image in the moving image data in chronological order and according to the values of symbols included in digital watermark information. According to the predetermined values of the pixels included in the watermark patterns, the digital watermark embedding device modifies the value of each pixel included in the area in which each of the images and the watermark patterns corresponding to the images are overlapped.

A digital watermark embedding method which permits a digital watermark detection from an acquired moving image in real time is also known (see Patent Document 4, for example). According to this digital watermark embedding method, a watermark pattern is generated using watermark information, frame display time, and watermark pattern switching information, and the watermark pattern is superimposed on a frame image of moving image data. A watermark embedded frame image group obtained by sequentially repeating such processes is combined to generate watermark embedded moving image data.

A watermark embedding method robust to de-flickering operations is also known (see Patent Document 5, for example). According to this watermark embedding method, each image is divided into at least a first and second image areas, and one value of a watermark sample is embedded in the image by increasing the global characteristic of the first image area and decreasing the global characteristic of the second image area. The other value of the watermark sample is embedded in the image by decreasing the global characteristic of the first image area and increasing the global characteristic of the second image area inversely.

A digital watermark embedding device for suppressing the flicker which occurs by embedding digital watermark information in a moving image is also known (see Patent Document 6, for example). This digital watermark embedding device generates a digital watermark pattern which includes a plurality of images having a first value, whose area varies in a constant cycle and in which a phase angle in a cycle variation of the area changes according to the values of symbols included in the digital watermark information. The digital watermark embedding device also generates a flicker suppressing pattern which includes a plurality of images having a second value, and whose area varies according to a frequency characteristic different from the cycle mentioned above. The digital watermark embedding device superimposes the digital watermark patterns and the flicker suppressing patterns on the image areas of each of the periodical images to modify the value of each pixel within the image areas on which the patterns are superimposed, depending on the first and second values.

Patent Document 1: Japanese Laid-open Patent Publication No. 2005-277732
Patent Document 2: Japanese Laid-open Patent Publication No. 2005-182164
Patent Document 3: Japanese Laid-open Patent Publication No. 2012-142741
Patent Document 4: International Publication Pamphlet No. WO 2007/015452
Patent Document 5: International Publication Pamphlet No. WO 2004/066626
Patent Document 6: Japanese Laid-open Patent Publication No. 2013-030974

SUMMARY

According to an aspect of the embodiments, the information embedding device includes a memory, a processor, and an output interface.

The memory stores first video information displayed on a display screen. The processor generates embedded information varying temporally and superimposes the embedded information on a video part at least corresponding to an edge of the display screen in the first video information so as to generate second video information on which the embedded information is superimposed. The output interface outputs the second video information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a flowchart of a first information detecting process;
FIG. 17 is a second functional block diagram of a generator;
FIG. 18 is a flowchart of a third information embedding process.

DESCRIPTION OF EMBODIMENTS

Embodiments will now be described in detail with reference to the drawings.

According to the method for detecting the points of four corners in Patent Document 1, differently from the often used straight line detection using the Hough transform, the coordinates of four corners in the image can be detected with a relatively small amount of computation, and according to the method for determining an image area in Patent Document 2, the amount of computation can be reduced by the fast Fourier transform, for example. Thus, the process could easily be performed with a terminal such as a smart device provided with a central processing unit (CPU) with a lower performance than that of a personal computer (PC).

On the other hand, when detecting the part corresponding to the display screen from the image of the imaged range that includes the display screen of the display device for displaying video, brightness and colors of the video displayed on the display screen may also be similar to those of the background except for the display screen. In this case, there is a good possibility that other rectangles such as a frame of the display device around the display screen will be erroneously detected as a border. An image of a frame could be synthesized in the periphery of the video displayed on the display screen in order to maintain detection accuracy, but the problem is that the appearance is marred because the image of the frame is conspicuous.

In order to detect a correct border of the display screen, a method for embedding a two-dimensional pattern having a spatial frequency characteristic in the video and extracting the frequency characteristic from the image of the imaged range including the display screen by the Fourier transform is also possible.

Unfortunately, in a case in which the image is not a printed image but rather video displayed on a display screen, such a static two-dimensional pattern rather stands out as noise that looks like frosted glass. If the two-dimensional pattern is weakened enough to be inconspicuous, its detection is difficult, so the application of spatial frequency characteristic to the video is difficult.

The problem in question occurs not only when detecting the display screen of a television set or digital signage terminal from the video imaged with a smart device, but also when detecting the display screen of other display devices from the video imaged with other imaging devices.

Figure 1:
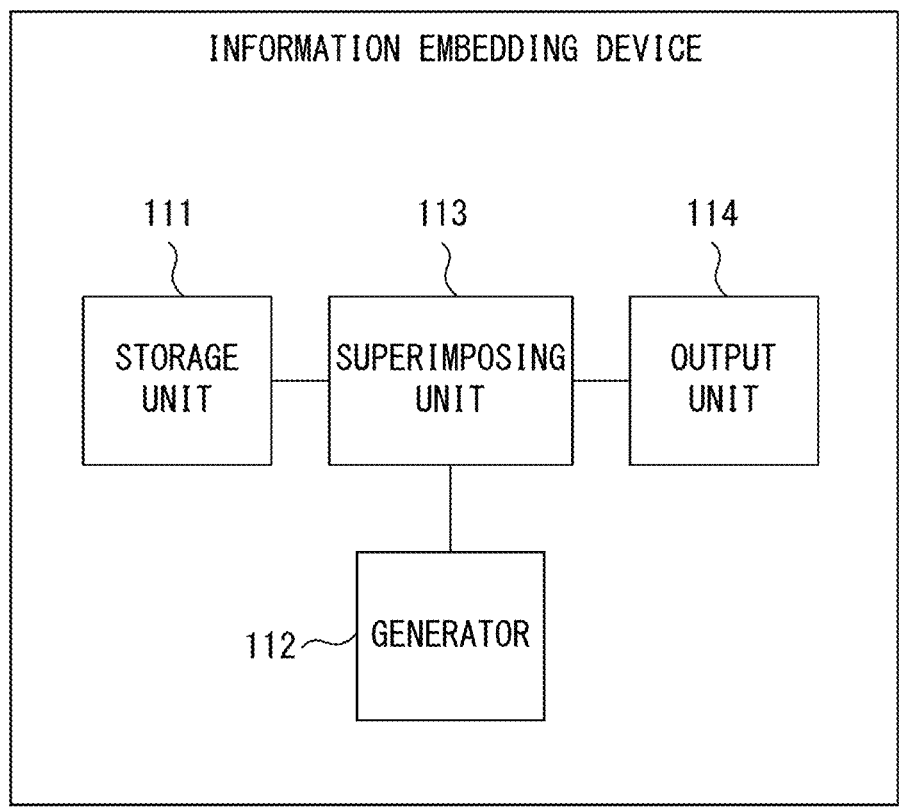
FIG. 1 is a functional block diagram of the information embedding device.

FIG. 1 illustrates a functional configurative example of the information embedding device according to the embodiments. The information embedding device 101 in FIG. 1 includes a storage unit 111, a generator 112, a superimposing unit 113, and an output unit 114.

The storage unit 111 stores first video information displayed on a display screen. The generator 112 and the superimposing unit 113 generate second video information from the first video information, and the output unit 114 (output interface) outputs the second video information.

Figure 2:
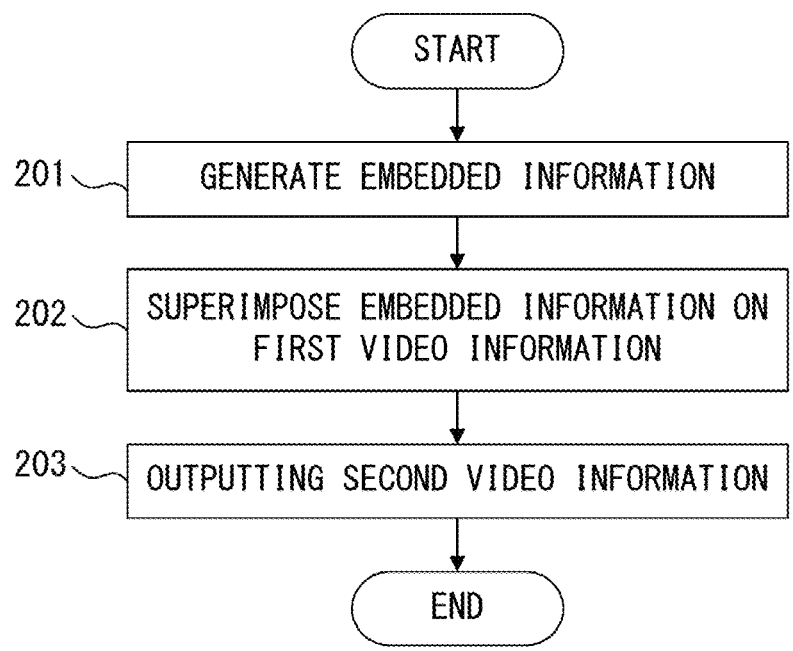
FIG. 2 is a flowchart of a first information embedding process.

FIG. 2 is a flowchart illustrating an example of an information embedding process performed by the information embedding device 101 in FIG. 1.

The generator 112 generates embedded information varying temporally (step 201). The superimposing unit 113 superimposes the embedded information on the video part at least corresponding to the edge of the display screen in the first video information so as to generate the second video information on which the embedded information is superimposed (step 202). The output unit 114 outputs the second video information (step 203).

The display screen is a display screen of display devices such as a television set and a digital signage terminal, and the second video information is displayed on the display screen. The edge of the display screen corresponds to a part or all of the periphery of the display screen. If the display screen is a television set, the output unit 114 can output the second video information to a broadcasting device of a broadcaster, and if the display device is a digital signage terminal, the output unit 114 can output the second video information to a distribution server of a distributor.

Figure 3:
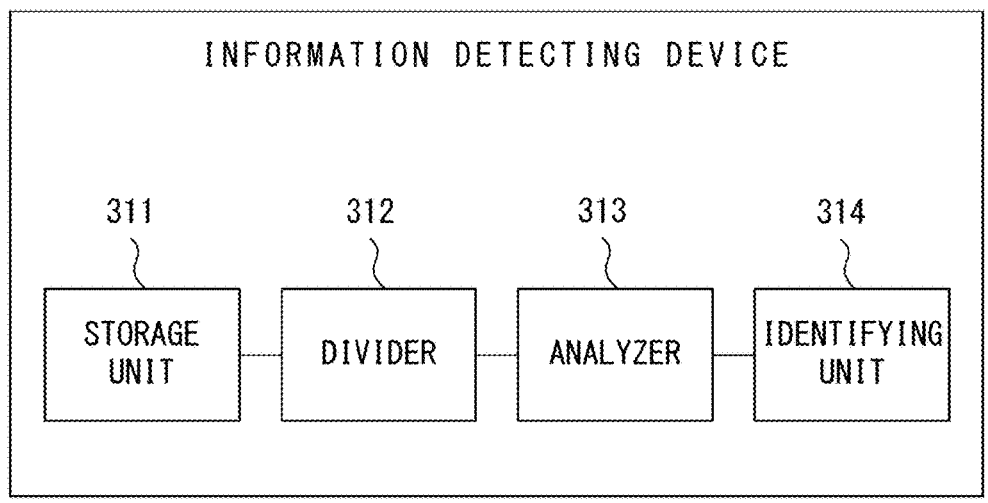
FIG. 3 is a functional block diagram of the information detecting device.

FIG. 3 illustrates a functional configurative example of the information detecting device which detects the information embedded by the information embedding device 101. The information detecting device 301 in FIG. 3 includes a storage unit 311, a divider 312, an analyzer 313, and an identifying unit 314.

The storage unit 311 stores third video information in which a range including the display screen displaying the second video information on which the temporally varying embedded information is superimposed is imaged.

If the display device displaying the second video information is a television set, the third video information can be obtained by imaging the display screen of the television set with an imaging device such as a camera. If the display device is a digital signage terminal, the third video information can be obtained by imaging the display screen of the digital signage terminal with an imaging device.

The divider 312 and the analyzer 313 detect the embedded information from the third video information, and the identifying unit 314 identifies the image part corresponding to the display screen.

FIG. 4 is a flowchart illustrating an example of the information detecting process performed by the information detecting device 301 in FIG. 3.

The divider 312 divides an image (such as a frame) included in the second video information into a plurality of areas (step 401). The analyzer 313 analyzes a temporal variation of a feature amount in at least one or more areas of the plurality of areas so as to detect the embedded information from the one or more areas (step 402). The identifying unit 314 identifies the image part corresponding to the display screen within the image on the basis of the position of the one or more areas (step 403).

The information embedding device 101 in FIG. 1 and the information detecting device 301 in FIG. 3 permit identifying the part corresponding to the display screen of another video included in a video in a way that is hard to be perceived by humans.

Figure 5:
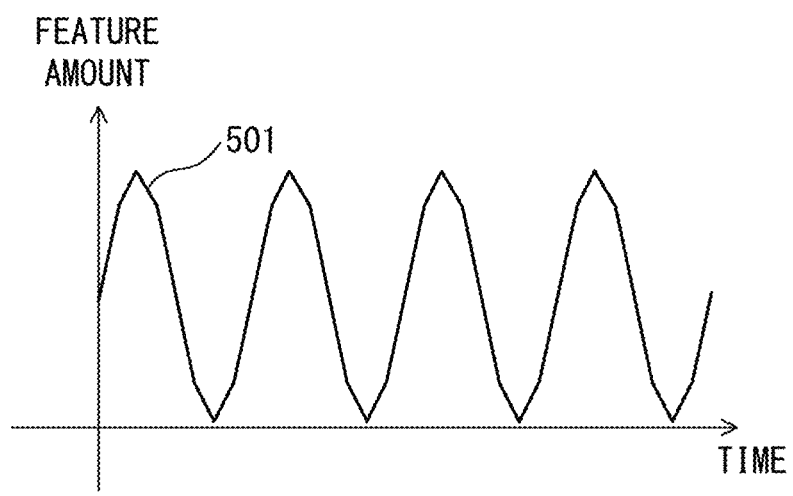
FIG. 5 is a diagram illustrating the embedded information of a prescribed pattern.

FIG. 5 illustrates an example of the embedded information. The embedded information in FIG. 5 represents a feature amount varying temporally according to a prescribed pattern 501 and is superimposed on a video part corresponding to an entirety of the display screen of the display device. As a feature amount, a statistical value of pixel values in each of the plurality of periodical images included in the video information can be used, for example, and as a pixel value, brightness signals, colors (such as RGB), and color difference signals, for example, can be used. As a statistical value of the pixel values, an average, maximum value, minimum value, median, and mode, for example, can be used.

If the statistical value of the pixel values are used as a feature amount, the superimposing unit 113 modifies the pixel values of the plurality of pixels included in the image so that the statistical value of those pixel values will vary temporally according to the pattern 501. The pixel values are preferably modified so that the statistical value can vary uniformly in any of the areas within the image according to the same pattern 501. As a pattern 501, a wavy pattern varying at a low frequency can be used, for example.

By using the technology in Patent Document 3, for example, the embedded information on the wavy pattern can be superimposed on the video information by increasing and decreasing the number of pixels in which the pixel value is modified according to the pattern. When an alpha blend, which is an example of image combining, is used to superimpose the embedded information on the images at each time, the image Z, which is a combination of the original image X and the image Y of the embedded information, is represented by the following formula:

$$Z=(1-\alpha)X+\alpha Y \quad (1)$$

The original image X, the image Y and the image Z in the formula (1) represent the two-dimensional array of pixel values. If the display device is a television set, the original image X will be an image included in the video of a broadcast program received by the television set, and if the display device is a PC, the original image X will be an image included in the video displayed on the display screen of the PC. If the display device is a digital signage terminal, the original image X will be an image included in the video displayed on the display screen of the digital signage terminal.

$\alpha$ in the formula (1) represents the ratio to superimpose the image Y and is a real number in the 0 to 1 range. If $\alpha=0$, the image Z conforms with the original image X, and if $\alpha=1$, the image Z conforms with the image Y of the embedded information. The bigger the value of a is, the more the ratio of the image Y increases, so the accuracy of detection increases but can be perceived more easily by humans. Thus, a is preferably adjusted to an appropriate value by a pre-estimate, for example.

Human vision is characterized by being able to easily identify a drastic change in brightness and colors in the time direction but not being able to easily identify a slow change in the time direction. Thus, by using the low-frequency wavy pattern varying slowly in the time direction, the embedded information which is not easily perceived by humans can be superimposed and displayed on the display screen. In this case, there is no concern that the image or video displayed on the display screen will not be able to be viewed or that the appearance will be marred. As a frequency of the wavy pattern, several hertz may be used.

As a waveform, forms such as a sine wave and a triangular wave, which can be detected by a frequency analysis such as the Fourier transform, are used. As a wave amplitude, amplitudes based on gradations of the display screen 602 can be used. If the brightness of the display screen 602 has 256 gray scale (8 bits), a wavy pattern can be used such that the amplitude of brightness is 256.

Figure 6:
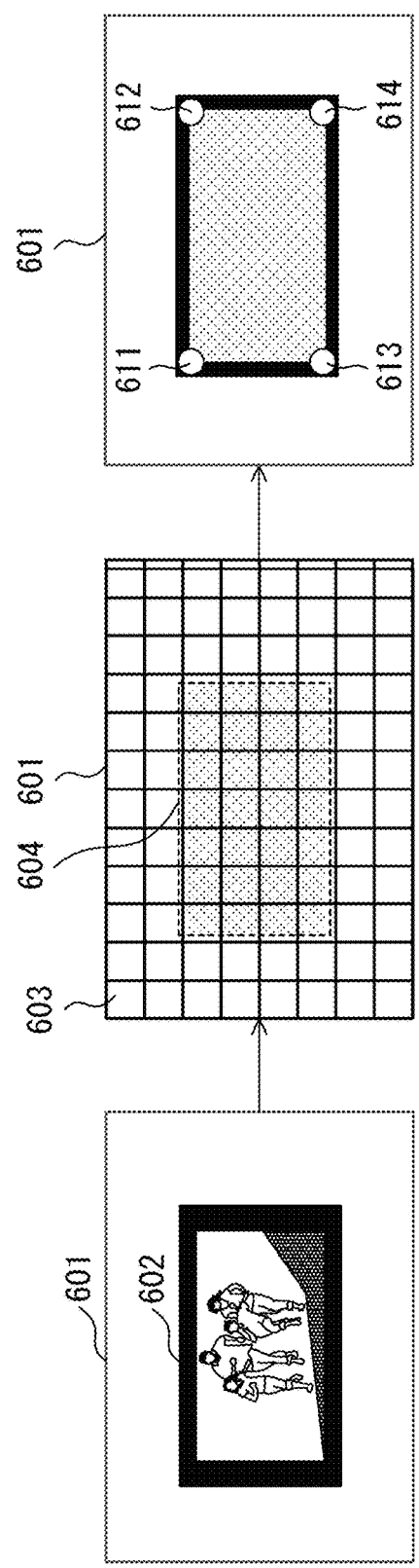
FIG. 6 is a diagram illustrating a process for detecting the embedded information of a prescribed pattern.

FIG. 6 illustrates an example of the information detecting process for detecting the embedded information in FIG. 5. The storage unit 311 of the information detecting device 301 stores video information imaged by an imaging device, for example. The information detecting device 301 can input the video information in the storage unit 311 through an input interface. The image 601 at each time included in the video information includes the image of the display screen 602, and the video information on which the embedded information is superimposed is displayed on the display screen 602.

The divider 312 divides the image 601 at each time into a plurality of areas 603. With respect to a plurality of periodical images, the analyzer 313 computes the feature amount in each area 603 to store the feature amount in the storage unit 311. Upon processing a prescribed number of images, the analyzer 313 makes frequency analysis such as the Fourier transform for each of the areas 603 with respect to the feature amount stored in the storage unit 311 to obtain a frequency characteristic in the time direction. This permits a spectrum representing the distribution of the amplitude or intensity of the feature amount in each area 603 to be obtained. As the prescribed number, the number of the plurality of images corresponding to the time length of one piece of embedded information may be used, for example.

As illustrated in FIG. 6, the amplitude or intensity at the frequency of the wavy pattern of the feature amount increases in each area 603 included in the image part 604 in which the image of the display screen 602 is located within the image 601. On the other hand, the amplitude or intensity at the frequency is almost 0 in each area 603 on which the embedded information is not superimposed, such as a background which excludes the display screen 602. Thus, the analyzer 313 can detect the embedded information from each area 603 included in the image part 604 on the basis of the spectrum of the feature amount.

The analyzer 313 binarizes the amplitude or intensity at the frequency of the embedded information in the spectrum for each of the areas 603, for example, so as to detect the embedded information from each area 603. Then, the analyzer 313 may binarize the amplitude or intensity by threshold processing. For threshold processing, a value which is less than the amplitude or intensity of the wavy pattern of the feature amount can be used as a threshold. A value corresponding to 50% of the amplitude or intensity of the wavy pattern of the feature amount may be used as a threshold.

For threshold processing, if the amplitude or intensity at the frequency of the embedded information in the area 603 is greater than or equal to the threshold, the analyzer 313 allots the logical value "1" to the area 603, and if the amplitude or intensity is less than the threshold, it allots the logical value "0" to the area 603.

The analyzer 313 may use a threshold in which the amplitude or intensity of the wavy pattern of the feature valueamount is assumed to decrease according to the camera parameter of an imaging device or the environment for imaging. The analyzer 313 may also refer to the distribution of the amplitude or intensity in the entirety of the image 601 to perform binarization by an adaptive process such as the discriminant analysis method.

The identifying unit 314 identifies the image part 604 corresponding to the display screen 602 on the basis of the position of the areas 603 having the value of the binarized amplitude or intensity, whichever is greater. For example, when binarization is performed with the logical values "1" and "0", a set of the areas 603 having the logical value "1" is identified as the image part 604.

If the display screen 602 is imaged by an imaging device, vertical inversion imaging or horizontal inversion imaging is not likely to be used. Thus, if the shape of the display screen 602 is rectangular, the identifying unit 314 can simply obtain the coordinates of the upper left vertex 611, upper right vertex 612, lower left vertex 613, and lower right vertex 614 of the image part 604 as coordinates representing the image part 604.

The utilization of the coordinates of these four vertexes allows correcting of a projective distortion depending on a positional relationship between the imaging device and the display screen 602 and allows cutting out the image part 604, which results in improving accuracies of video recognition and of digital watermark detection in a subsequent stage.

If the shape of the image 601 is rectangular, the divider 312 can use a rectangular area of M pixels×N pixels (in which M and N are an integer greater than or equal to 1) as each area 603. If the size of this rectangular area is made smaller, more precise coordinates representing the image part 604 can be obtained. If the size of the area 603 is made smaller, the number of areas 603 increases, and the number of computations of frequency analysis also increases. The preferable accuracy of the coordinates also depends on the method for recognizing video and the method for embedding a digital watermark.

For example, according to the digital watermark embedding method in Patent Document 4, each frame included in the video is divided into a plurality of blocks to superimpose the watermark pattern on a frame image. In this case, the accuracy of digital watermark detection becomes lower if the border of blocks is misaligned, so errors of the coordinates are preferably within a few pixels. Thus, if this digital watermark embedding method is used, the values of a few pixels are used as values for M and N representing the size of the area 603.

According to the watermark embedding method in Patent Document 5, each image is divided into two image areas, and the size of one image area is greater than that of the block in Patent Document 4. For this reason, even if there are a few errors, the global characteristic in the image areas obtained by the watermark detector is less affected. Thus, if this watermark embedding method is used, the values of more than a few pixels can be used as values for M and N representing the size of the area 603.

The size of the area 603 is preferably adjusted according to the applications because the information volume which can be embedded in the video information per unit of time increases in proportion to the number of blocks or image areas.

The information detecting process in the embodiments is applicable not only as a preprocessing for a digital watermark detecting method relatively robust to a misalignment as described in Patent Documents 3 and 5, but also as a preprocessing for a digital watermark detecting method based on the highly accurate coordinates as described in Patent Document 4.

The embedded information in FIG. 5 is superimposed on video information so that the image part corresponding to the display screen can be identified from video information of that is a captured image of the range that includes the display screen displaying the video information. However, in practice, due to a disturbance such as the lighting around the display screen, there is a possibility that the signal of the specific frequency will not be detected even if frequency analysis is performed. For example, if the display screen is imaged under a mercury lamp, noise occurs in the imaged video information, and if the frequency characteristic of the noise is similar to the superimposed embedded information, the detection of the signal of the embedded information becomes difficult due to the interference between the signal and the noise.

In order to increase resistance to the noise by the information detecting process, embedded information based on a plurality of different frequencies, rather than on a single frequency, could be used.

Figure 7:
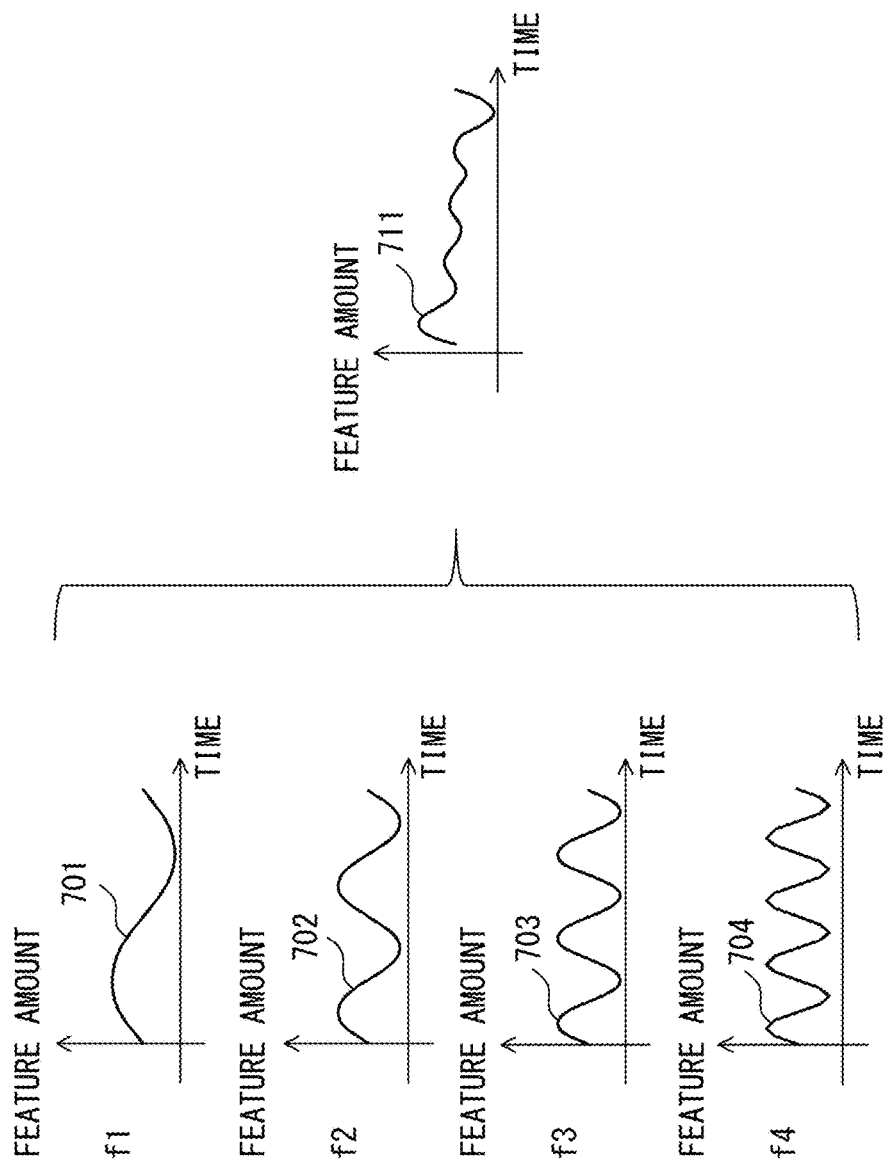
FIG. 7 is a diagram illustrating embedded information based on four frequencies.

FIG. 7 illustrates an example of embedded information based on four frequencies. The embedded information in FIG. 7 represents the feature amount varying temporally according to the pattern 711 and is superimposed on the video part corresponding to the entirety of the display screen of the display device.

The pattern 711 is generated by combining the pattern 701 varying at the frequency f1, the pattern 702 varying at the frequency f2, the pattern 703 varying at the frequency f3, and the pattern 704 varying at the frequency f4. For example, the four patterns can be combined by obtaining the sum, average and the like, of those patterns.

As frequencies f1-f4, several hertz may be used. The four frequencies are, however, different from each other. As a waveform for the patterns 701-704, a sine wave or triangular wave, for example, can be used, and as a wave amplitude, an amplitude based on gray scale of the display screen 602 can be used.

The superimposing unit 113 modifies the pixel values of the plurality of pixels included in the image by image combining using the formula (1), for example, so that the statistical value of those pixel values will vary temporally according to the pattern 711. The superimposing unit 113 may superimpose the information of the patterns 701-704 on the video information by using the digital watermark embedding method in Patent Document 6.

Figure 8:
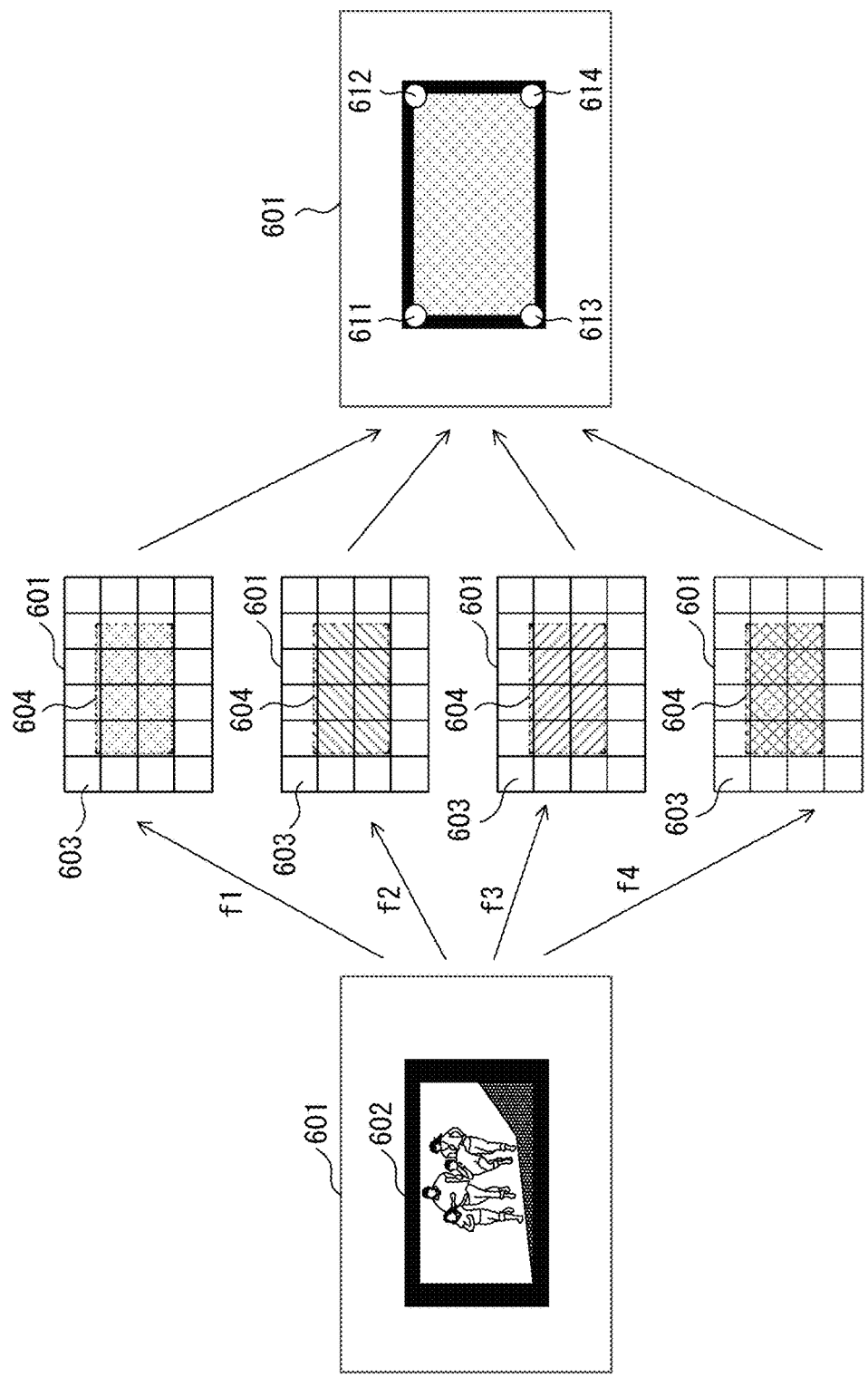
FIG. 8 is a diagram illustrating a process for detecting the embedded information based on four frequencies.

FIG. 8 illustrates an example of the information detecting process for detecting the embedded information in FIG. 7. In this case, the analyzer 313 obtains a spectrum representing the distribution of the amplitude or intensity of the feature amount in each area 603. The analyzer 313 combines and binarizes the amplitude or intensity (frequency components) at the frequencies f1-f4 in the spectrum for each of the areas 603, for example, so as to detect the embedded information from each area 603. For example, the frequency components at the four frequencies can be combined by obtaining the sum, average and the like of those frequency components.

The identifying unit 314 obtains the coordinates of the vertexes 611-614 as coordinates representing the image part 604 corresponding to the display screen 602 on the basis of the position of the areas 603 in which the embedded information is detected.

If the environment for imaging is good, all the frequency components are detected from each area 603 included in the image part 604. If the environment for imaging is not good, there is a possibility that one or more of the frequency components will not be detected due to the noise occurring in the background of the image 601. Even in this case, the image part 604 can still be identified on the basis of the other frequency components.

Figure 9:
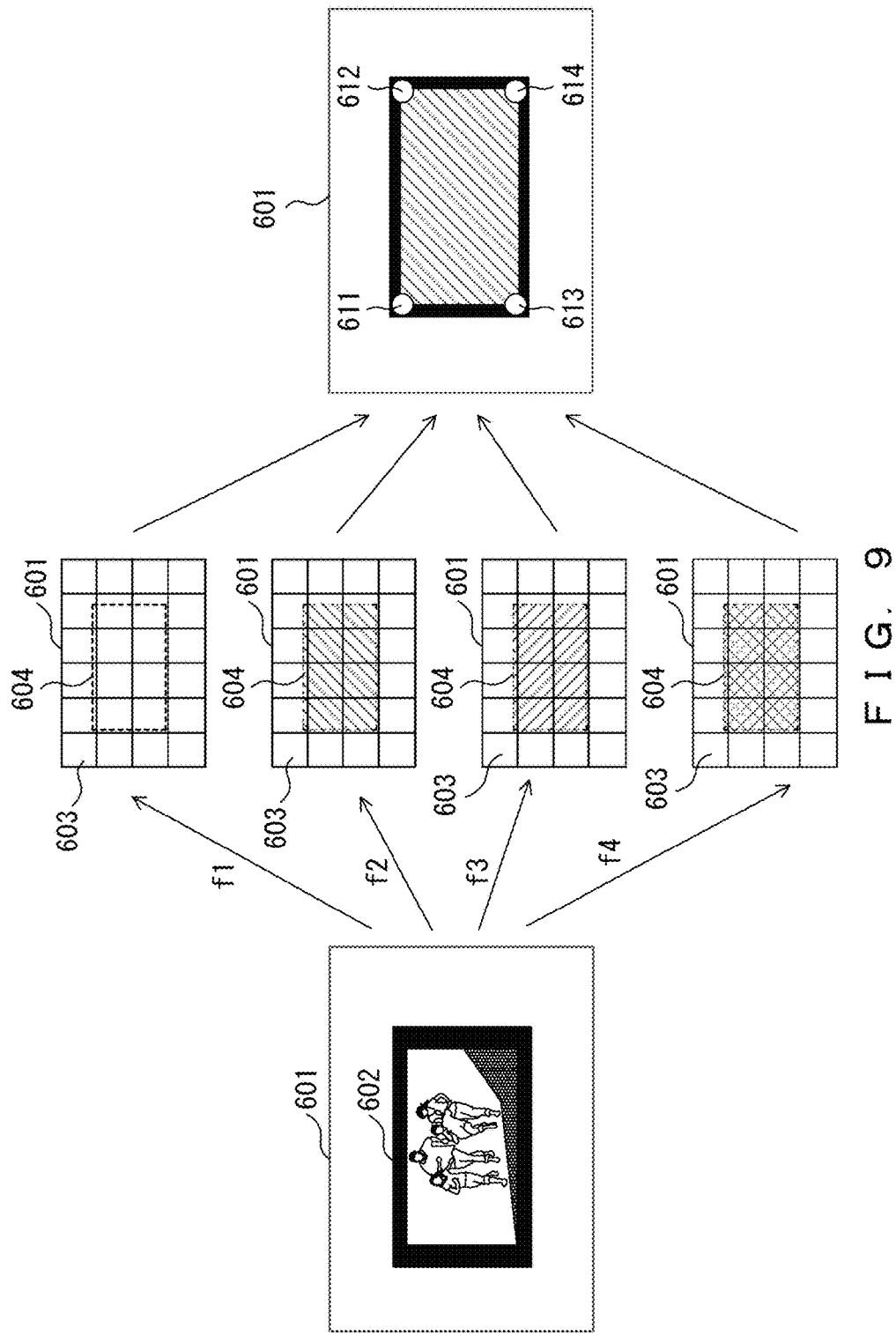
FIG. 9 is a diagram illustrating the case in which the frequency components of the frequency f1 are not detected.

As illustrated in FIG. 9, for example, even if the frequency component of the frequency f1 is not detected, the coordinates of the vertexes 611-614 can be detected on the basis of the frequency components at the frequencies f2-f4. Thus, resistance to the noise by the information detecting process is improved with the embedded information in FIG. 7. Instead of the embedded information based on four frequencies, embedded information based on two, three, or more than or equal to five frequencies may be used.

Figure 10:
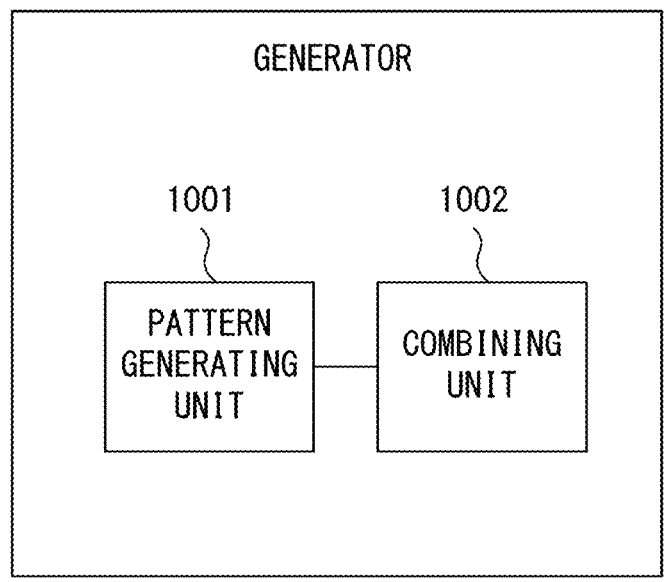
FIG. 10 is a first functional block diagram of a generator.

FIG. 10 illustrates a functional configurative example of the generator 112 which generates the embedded information based on a plurality of different frequencies. The generator 112 in FIG. 10 includes a pattern generating unit 1001 and a combining unit 1002. The pattern generating unit 1001 generates a plurality of patterns varying temporally at the different frequencies respectively, and the combining unit 1002 combines those patterns to generate the embedded information.

Figure 11:
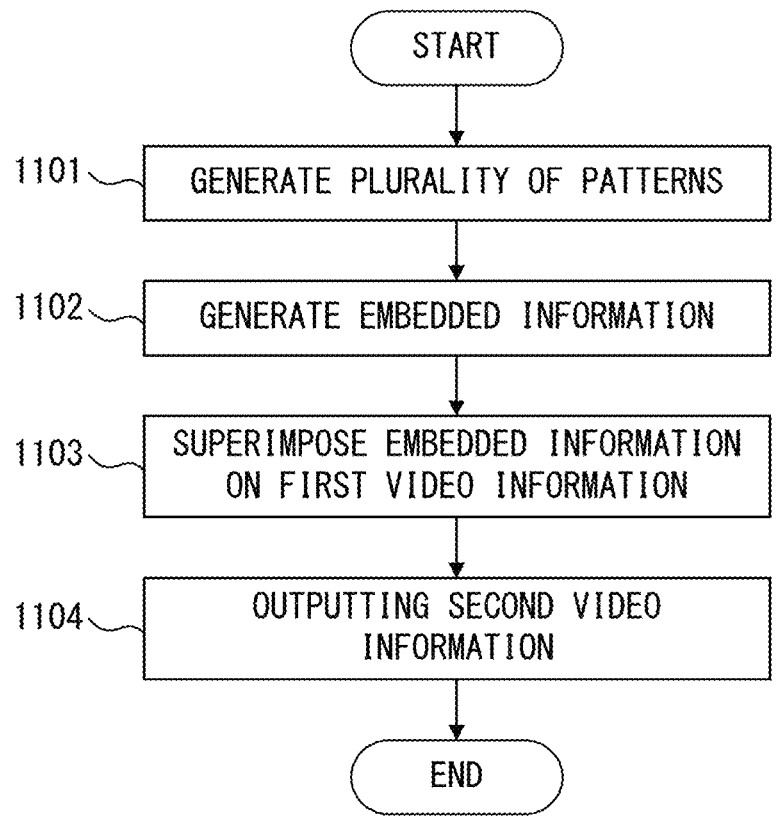
FIG. 11 is a flowchart of a second information embedding process.

FIG. 11 is a flowchart illustrating an example of the information embedding process when using the embedded information based on a plurality of different frequencies.

The pattern generating unit 1001 of the generator 112 generates the plurality of patterns varying temporally at the different frequencies respectively (step 1101), and the combining unit 1002 combines those patterns to generate the embedded information (step 1102).

The process of steps 1103 and 1104 in FIG. 11 is the same as that of steps 202 and 203 in FIG. 2.

Figure 12:
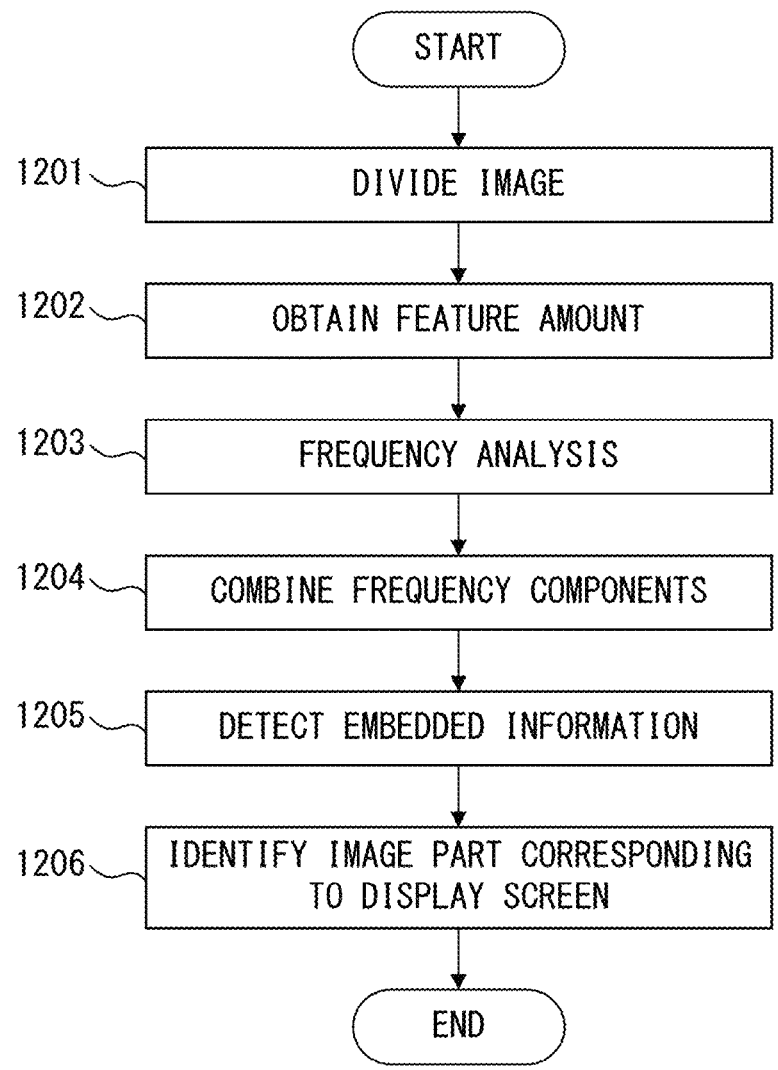
FIG. 12 is a flowchart of a second information detecting process.

FIG. 12 is a flowchart illustrating an example of the information detecting process when using the embedded information based on a plurality of different frequencies.

The divider 312 of the information detecting device 301 divides the image included in the second video information into a plurality of areas (step 1201).

The analyzer 313 computes the feature amount in each area (step 1202), performs frequency analysis for each of the areas, and obtains a spectrum representing the distribution of the amplitude or intensity of the feature amount in each area (step 1203). Then, the analyzer 313 combines the frequency components at a plurality of frequencies in the spectrum for each of the areas (step 1204) so as to detect the embedded information from each area on the basis of the result of combining (step 1205).

The identifying unit 314 identifies the image part corresponding to the display screen within the image on the basis of the position of the areas in which the embedded information is detected (step 1206).

According to the information embedding process in FIG. 11 and the information detecting process in FIG. 12, the part corresponding to the display screen of another video included in a video can be identified in a way that is hard to be perceived by humans. Even if one or more of the frequency components is not detected, the image part corresponding to the display screen can still be identified on the basis of the other frequency components, which results in improving resistance to the noise by the information detecting process.

Preferably, not only the coordinates of the four corners of the display screen, but also the coordinates of the center of the display screen may be used for the process in a subsequent stage, depending on the environment for imaging.

Figures 13A, 13B:
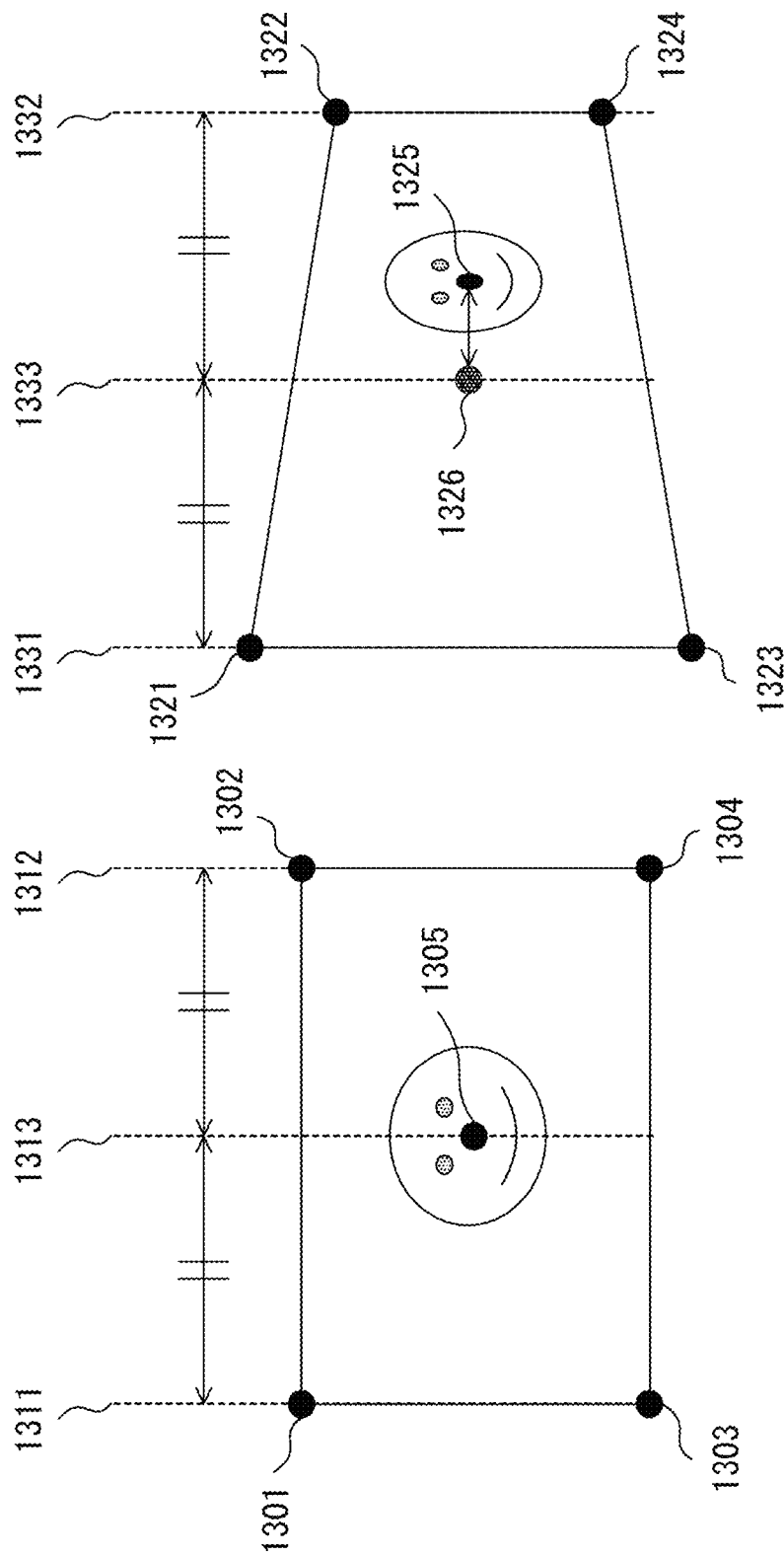
FIG. 13A is a diagram illustrating a display screen imaged from the front.
FIG. 13B is a diagram illustrating a display screen imaged from an angle.

As illustrated in FIG. 13A, for example, when the display screen is imaged from the front, a straight line 1313 whose distances from a straight line 1311 passing through the vertexes 1301 and 1303 and from a straight line 1312 passing through the vertexes 1302 and 1304 are the same can be obtained. In this case, the center 1305 of the display screen is not so misaligned from the straight line 1313, and the coordinates of the center 1305 can be obtained on the basis of the coordinates of the vertexes 1301-1304.

On the other hand, as illustrated in FIG. 13B, when the display screen is imaged from an angle, a straight line 1333 whose distances from a straight line 1331 passing through the vertexes 1321 and 1323 and from a straight line 1332 passing through the vertexes 1322 and 1324 are the same can be obtained. The center 1325 of the display screen is, however, greatly misaligned from the point 1326 on the straight line 1333 by a projective distortion, and obtaining the coordinates of the center 1325 on the basis of the coordinates of the vertexes 1321-1324 is difficult.

For image processing, a highly accurate correction with respect to the projective distortion executes a huge number of computations, which is a lot of load for a smart device. Thus, the projective distortion could be corrected with simple computations, but the correction of the alignment of the center is difficult. When using the technologies for recognizing video and for detecting digital watermarks, image processing is often performed by dividing images into blocks, and the misalignment of the centers has a great influence on the accuracy of processing.

Then, the coordinates of the center are preferably obtained in addition to the coordinates of the four corners of the display screen so that the misalignment of the center can be corrected even if the display screen is imaged from an angle. The information at the different frequencies could be respectively embedded in a plurality of parts of the display screen.

Figure 14:
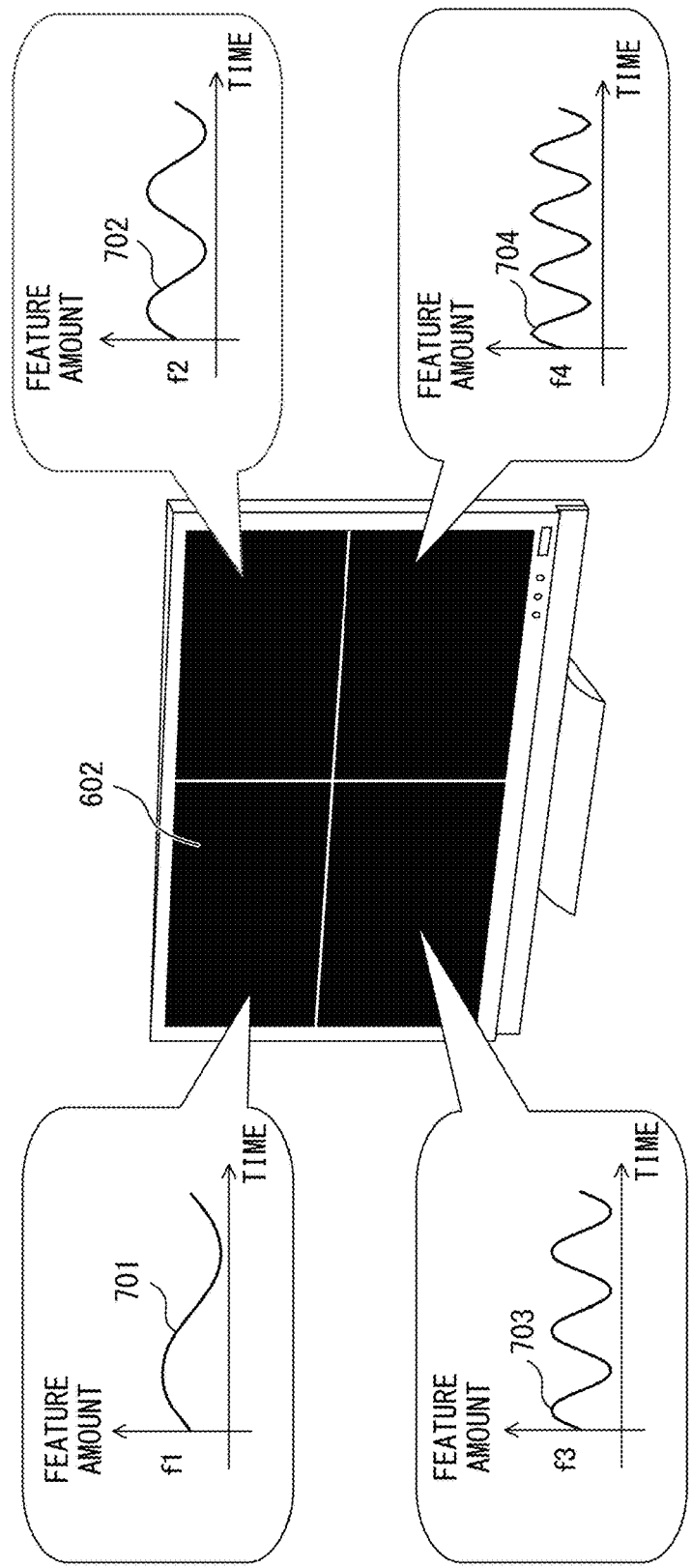
FIG. 14 is a diagram illustrating the embedded information with respect to four parts of the display screen.

FIG. 14 illustrates an example of the embedded information for respectively embedding the information at the different frequencies in the four parts of the display screen. The embedded information in FIG. 14 includes the pattern 701 varying at the frequency f1, the pattern 702 varying at the frequency f2, the pattern 703 varying at the frequency f3, and the pattern 704 varying at the frequency f4.

The display screen 602 of the display device is divided into four parts: the upper left part, upper right part, lower left part, and lower right part; the information of the pattern 701 is superimposed on the video part corresponding to the upper left part; and the information of the pattern 702 is superimposed on the video part corresponding to the upper right part. The information of the pattern 703 is superimposed on a video part corresponding to the lower left part, and the information of the pattern 704 is superimposed on the video part corresponding to the lower right part.

The superimposing unit 113 modifies the pixel values of the plurality of pixels included in each of the parts of the display screen 602 by image combining with the formula (1), for example, so that the statistical value of those pixel values can vary temporally according to any of the patterns 701-704. Preferably, the pixel values will be modified so that the statistical value can vary uniformly in any of the areas within one part according to the same pattern.

As a shape of the divided parts of the display screen 602, a rectangle, polygon, circle and the like, can be used. The display screen 602 may be divided into a plurality of parts having a different shape from each other.

Figure 15:
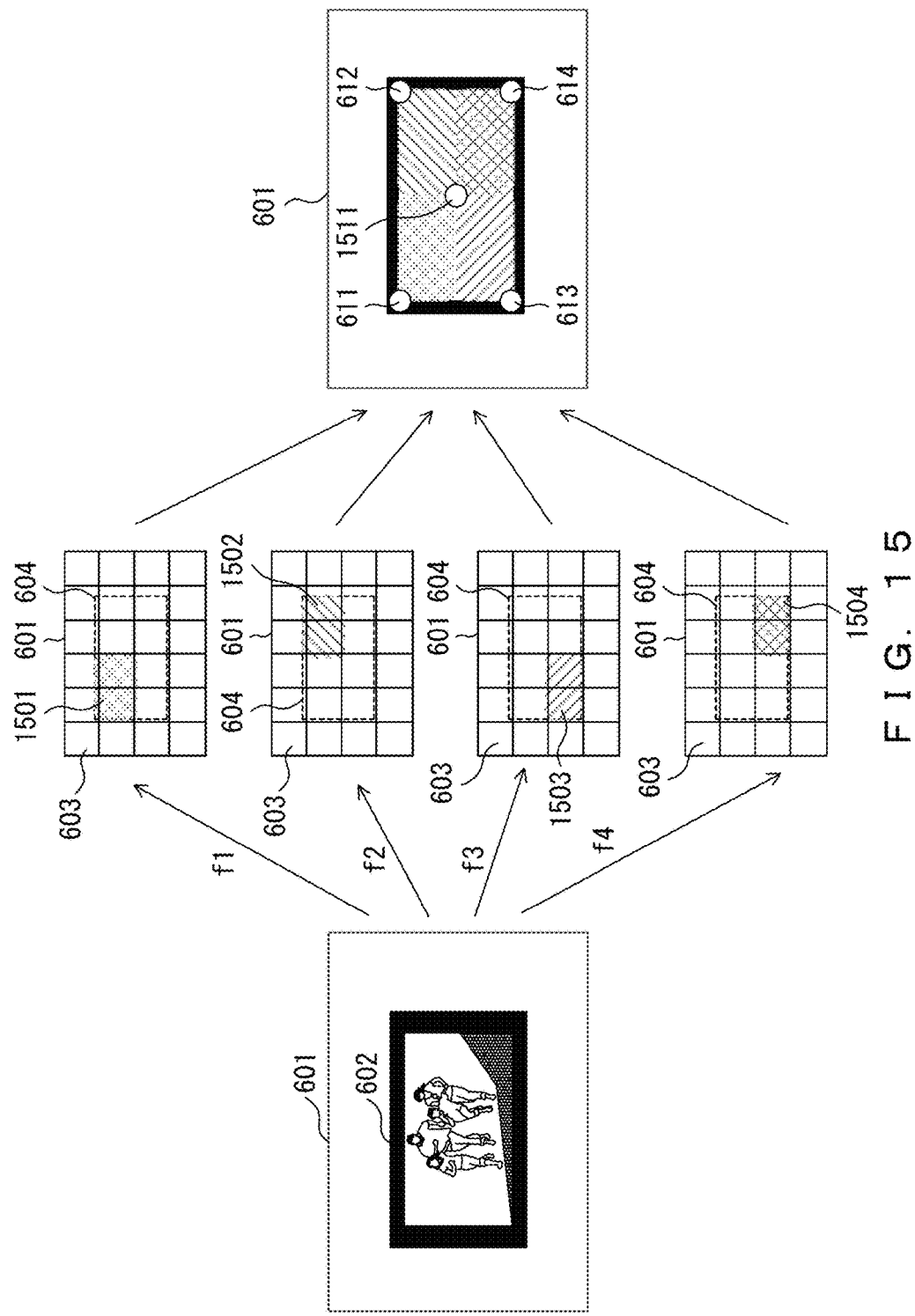
FIG. 15 is a diagram illustrating a process for detecting the embedded information from four parts of the display screen.

FIG. 15 illustrates an example of the information detecting process for detecting the embedded information in FIG. 14. In this case, the analyzer 313 obtains a spectrum representing the distribution of the amplitude or intensity of the feature amount in each area 603. The analyzer 313 binarizes the frequency components at each of the frequencies f1-f4 in the spectrum for each of the areas 603 so as to detect the embedded information from each area 603, for example.

Then, in the image part 604 corresponding to the display screen 602, in each area 603 included in an image part 1501 on which the information of the pattern 701 is superimposed, the frequency component of the frequency f1 is binarized because that frequency component becomes large. Similarly, the frequency component of the frequency f2 is binarized in each area 603 included in an image part 1502 on which the information of the pattern 702 is superimposed. The frequency component of the frequency f3 is binarized in each area 603 included in an image part 1503 on which the information of the pattern 703 is superimposed. The frequency component of the frequency f4 is binarized in each area 603 included in an image part 1504 on which the information of the pattern 704 is superimposed.

As mentioned above, because whether or not the embedded information is detected from each area 603 is detected, and in addition, the frequencies of the detected, embedded information are detected, each area 603 can be classified on the basis of the frequencies.

The identifying unit 314 identifies the image parts 1501-1504 to obtain the coordinates of the vertexes 611-614 and the center 1511 of the display screen 602, on the basis of the position of the areas 603 in which the embedded information is detected and the frequencies of the detected, embedded information. The coordinates of the center 1513 can be obtained as coordinates of the lower right vertex of the image part 1501, lower left vertex of the image part 1502, upper right vertex of the image part 1503, or upper left vertex of the image part 1504.

If the environment for imaging is not good, there is a possibility that one or more of the frequency components will not be detected due to the noise occurring in the background of the image 601. Even in this case, the image part 604 can still be identified on the basis of the other frequency components.

Figure 16:
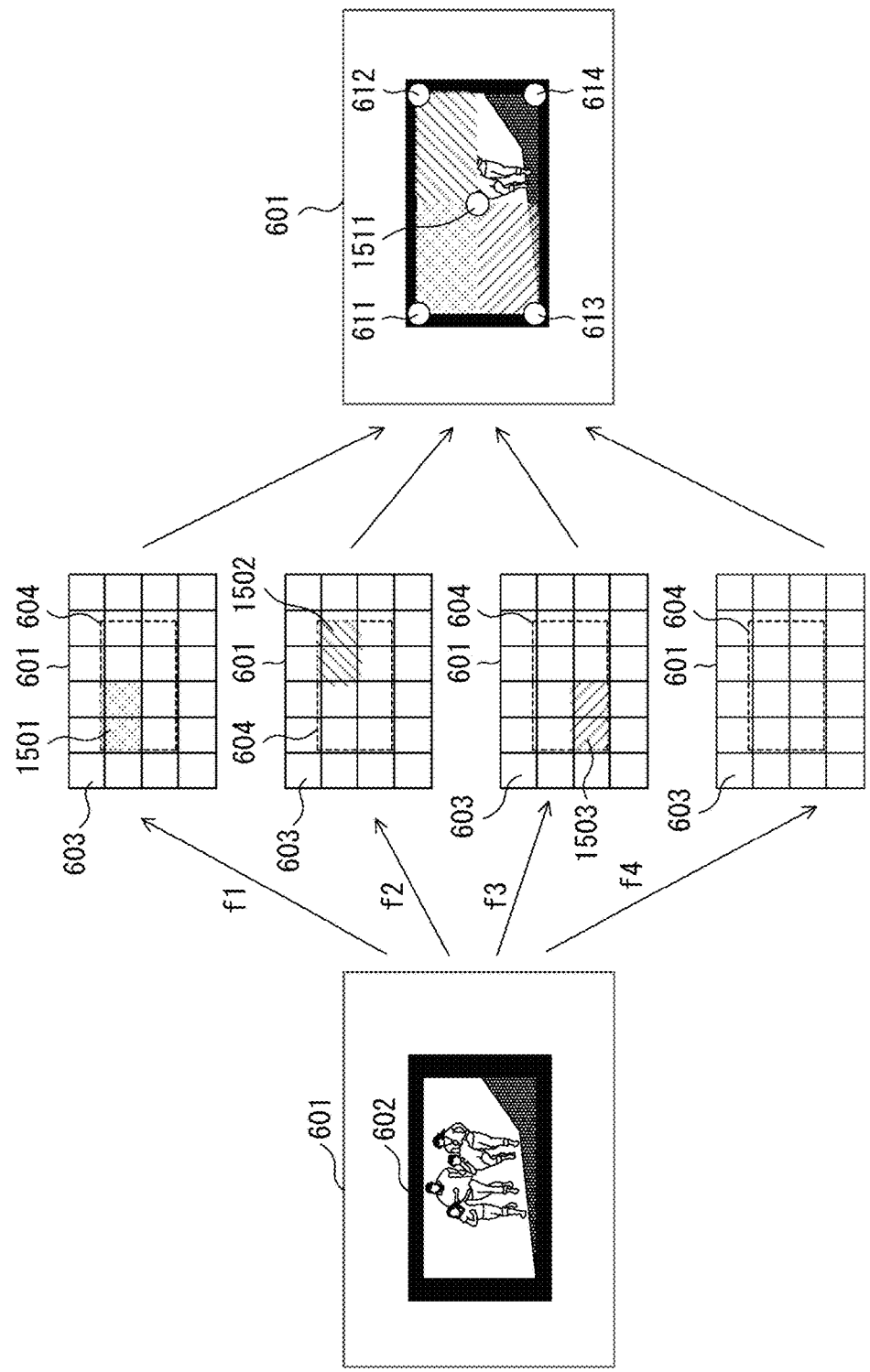
FIG. 16 is a diagram illustrating the case in which the frequency components of the frequency f4 are not detected.

As illustrated in FIG. 16, for example, even if the image part 1504 is not identified because the frequency component of the frequency f4 is not detected, the image parts 1501-1503 will be detected if the frequency components at the frequencies f1-f3 are detected. Thus, the coordinates of the vertexes 611-613 and the center 1511 can be obtained on the basis of the position of the image parts 1501-1503. If the shape of the display screen 602 is known, the coordinates of the vertex 614 can be estimated from the coordinates of the vertexes 611-613.

Thus, resistance to the noise by the information detecting process is improved with the embedded information in FIG. 14. Instead of dividing the display screen into four parts to embed the information at the different frequencies in those parts respectively, the display screen may be divided into two, three, or more than or equal to five parts to embed the information at the different frequencies in those parts, respectively.

FIG. 17 illustrates a functional configurative example of the generator 112 when the information at the different frequencies is embedded in the plurality of parts of the display screen, respectively. The generator 112 in FIG. 17 includes the pattern generating unit 1001. The pattern generating unit 1001 generates the plurality of patterns varying temporally at the different frequencies, respectively.

FIG. 18 is a flowchart illustrating an example of the information embedding process when the information at the different frequencies is embedded in the plurality of parts of the display screen, respectively.

The pattern generating unit 1001 of the generator 112 generates the plurality of patterns varying temporally at the different frequencies, respectively (step 1801).

The superimposing unit 113 superimposes the information of the plurality of patterns on the plurality of video parts corresponding to the plurality of parts of the display screen in the first video information, respectively, so as to generate the second video information on which the embedded information is superimposed (step 1802). The output unit 114 outputs the second video information (step 1803).

Figure 19:
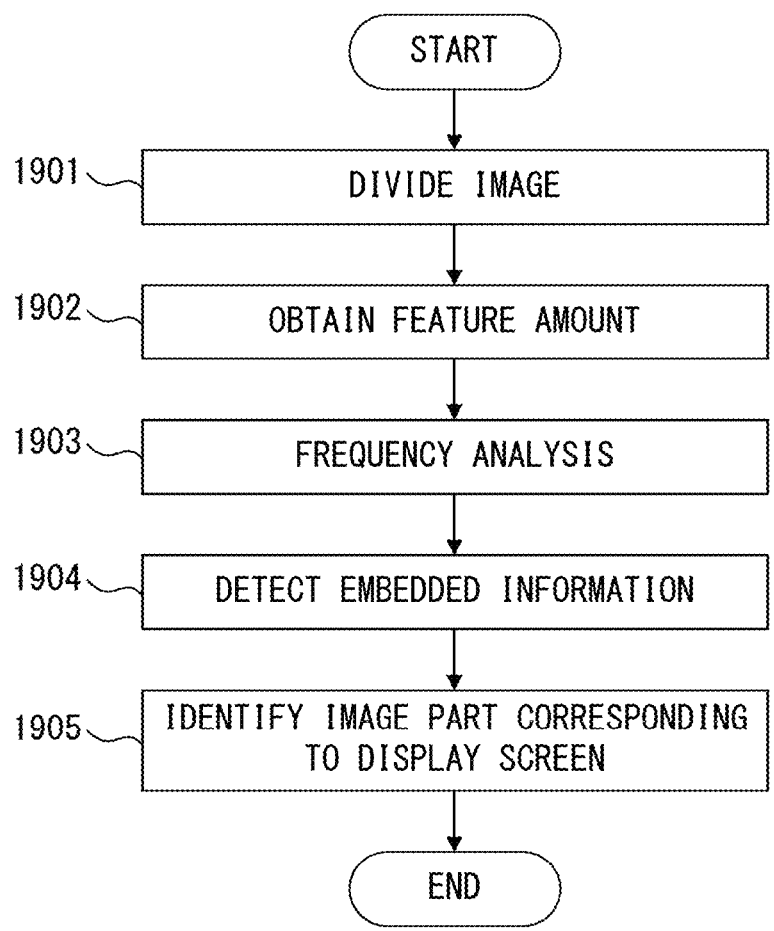
FIG. 19 is a flowchart of a third information detecting process.

FIG. 19 is a flowchart illustrating an example of the information detecting process when the information at the different frequencies is embedded in the plurality of parts of the display screen, respectively.

The process of steps 1901-1903 in FIG. 19 is the same as that of steps 1201-1203 in FIG. 12.

The analyzer 313 of the information detecting device 301 obtains the spectrum of the feature amount at step 1903 to detect the embedded information from the biggest frequency component in the spectrum for each of the areas (step 1904).

The identifying unit 314 identifies the image part corresponding to the display screen within the image, on the basis of the position of the areas in which the embedded information is detected and the frequencies of the detected, embedded information (step 1905).

According to the information embedding process in FIG. 18 and the information detecting process in FIG. 19, the part corresponding to the display screen of another video included in a video can be identified in the way that is hard to be perceived by humans. Even if one or more of the frequency components is not detected, the image part corresponding to the display screen can still be identified on the basis of the other frequency components, which results in improving resistance to the noise by the information detecting process.

Moreover, since the coordinates of the center can be identified in addition to the coordinates of the four corners of the display screen, the distortion can be corrected by using the coordinates of the four corners and the center even if the video is distorted by imaging from an angle. The coordinates of the points excluding the center within the display screen can be also identified if the shape of the divided parts of the display screen are changed.

An application of the information embedding device 101 in FIG. 1 and the information detecting device 301 in FIG. 3 to other technologies will now be described. The other technologies include technologies for recognizing video and for detecting digital watermarks.

When the information embedding device 101 and the information detecting device 301 are applied to the digital watermark detecting technology, embedded information as well as a digital watermark are superimposed on video information. When detecting the digital watermark from the video information, the digital watermark is detected from the image part identified on the basis of the embedded information.

Figure 20:
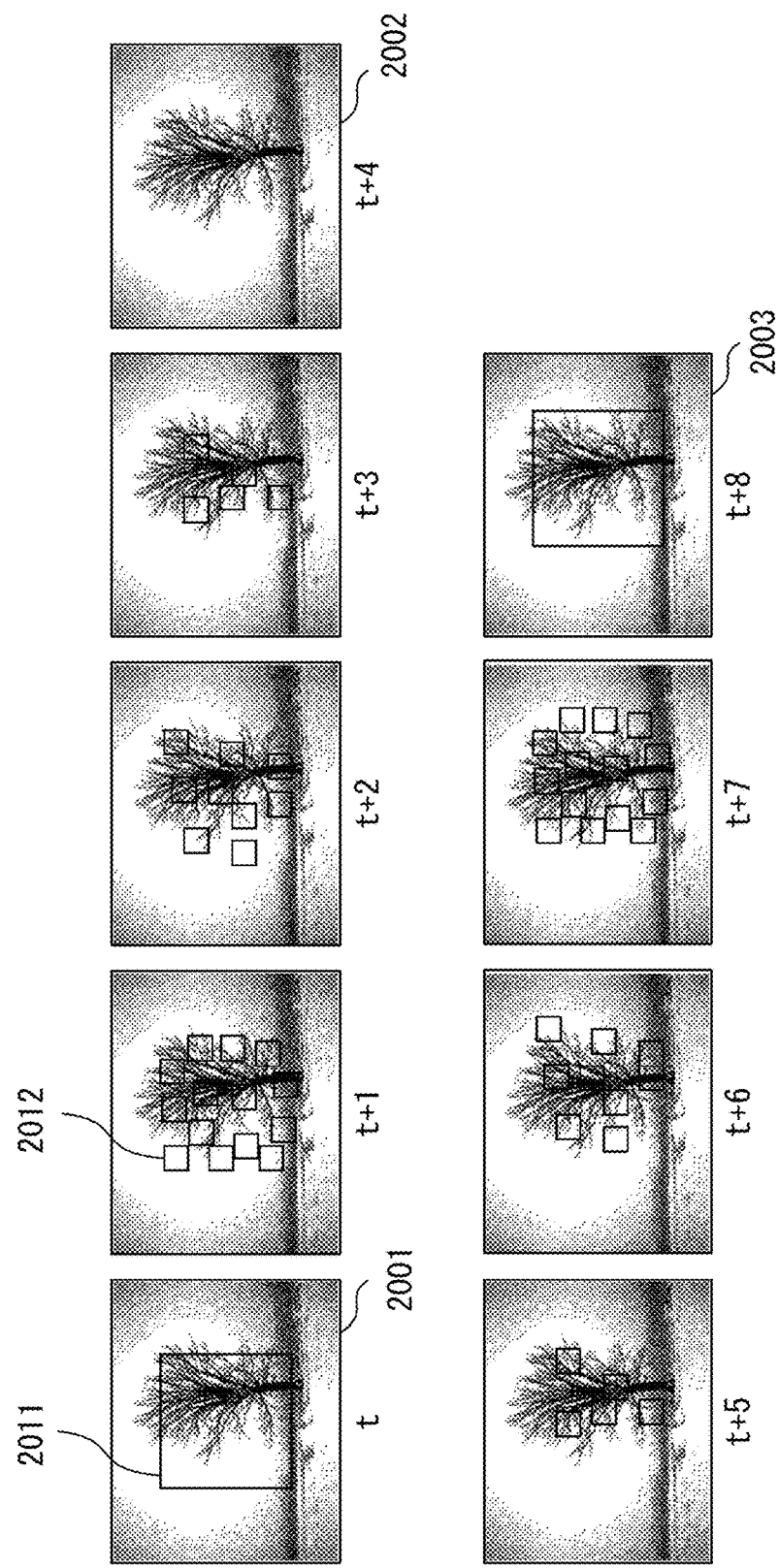
FIG. 20 is a diagram illustrating a watermark pattern varying temporally.

There are various methods for digital watermarking, and the method in Patent Document 3 will be used as an example. As illustrated in FIG. 20, the digital watermark embedding device in Patent Document 3 superimposes a watermark pattern including one or more watermark blocks on each image included in the video information. Then, the digital watermark embedding device periodically varies an area of the watermark pattern in chronological order and according to the values of symbols included in the digital watermark information.

FIG. 20 illustrates an example of the temporally successive nine images from the time t to the time (t+8). A rectangular watermark pattern 2011 is superimposed on an image 2001 at the time t. From the time t to the time (t+4), the area of the watermark pattern which is superimposed on the image decreases by the decrease in the number of watermark blocks 2012. The watermark patterns disappear in an image 2002 at the time (t+4). After the time (t+4), an area of watermark patterns increases, and the area of watermark patterns becomes maximal again in an image 2003 at the time (t+8).

Since the brightness and colors of the entirety of the image vary as a scene progresses by such an increase and decrease in the area of the watermark pattern, the digital watermark information can be embedded in the video information by using the variation.

The video information in which the digital watermark information is embedded in this way is displayed on a display screen of a television set, PC, or digital signage terminal, for example. The embedded digital watermark information can be detected by imaging the display screen using a smart device and analyzing the imaged video information. Such a digital watermark technology permits displaying the content linked to television programs and advertisements on the screen of the smart device.

As illustrated in FIG. 6, in addition to the display screen 602 as an object, the background is also located in the image 601 of the imaged video information in an actual environment for imaging, so noise may occur in the background due to the light from a lighting device, for example.

The digital watermark embedding device in Patent Document 3 superimposes the watermark patterns having a specific frequency characteristic on the video information so as to embed the digital watermark information, and the digital watermark detecting device extracts the frequency characteristic by frequency analysis such as the Fourier transform to restore the original digital watermark information. Thus, if the frequency characteristic of the noise generated in the background is similar to the watermark pattern, the detection of the digital watermark information will be difficult. For this reason, the effect of the noise is preferably eliminated as much as possible in order to improve the accuracy of detection of the digital watermark information.

The effect of the noise in the background can be eliminated to perform frequency analysis if the target of the frequency analysis for detecting digital watermarks is limited to the pixels within an image part identified by the information detecting device 301 by using the information on the image part. In this case, the digital watermark detecting device may divide each image into a plurality of areas, perform frequency analysis for each of the areas, adopt the results of analysis in each area within the image part corresponding to the display image, and abandon the results of analysis in the other areas. In addition, the digital watermark detecting device may obtain the sum of the results of analysis in all the areas after a weighting of the results of analysis in each area within the image part is set to be larger than that in the other areas by weighting processing.

As a result, if the noise occurs in the background but not in the display screen, the accuracy of detection of the digital watermark information can increase by eliminating the effect of the noise.

The configurations of the information embedding device 101 in FIG. 1 and the information detecting device 301 in FIG. 3 are merely examples, and some of the elements may be omitted or changed according to applications or conditions of the information embedding device or information detecting device.

The flowcharts in FIGS. 2, 4, 11, 12, 18, and 19 are merely examples, and parts of the process may be omitted or changed according to configurations or conditions of the information embedding device or information detecting device. For example, at step 202 in FIG. 2, step 1103 in FIG. 11, and step 1802 in FIG. 18, the embedded information may be superimposed only on the video part corresponding to part or all of the periphery of the display screen, not on the video part corresponding to the entirety of the display screen.

For the information detecting process in FIG. 12, the process of step 1204 in FIG. 12 can be omitted if the embedded information is detected without combining the frequency components at the plurality of frequencies.

Figure 21:
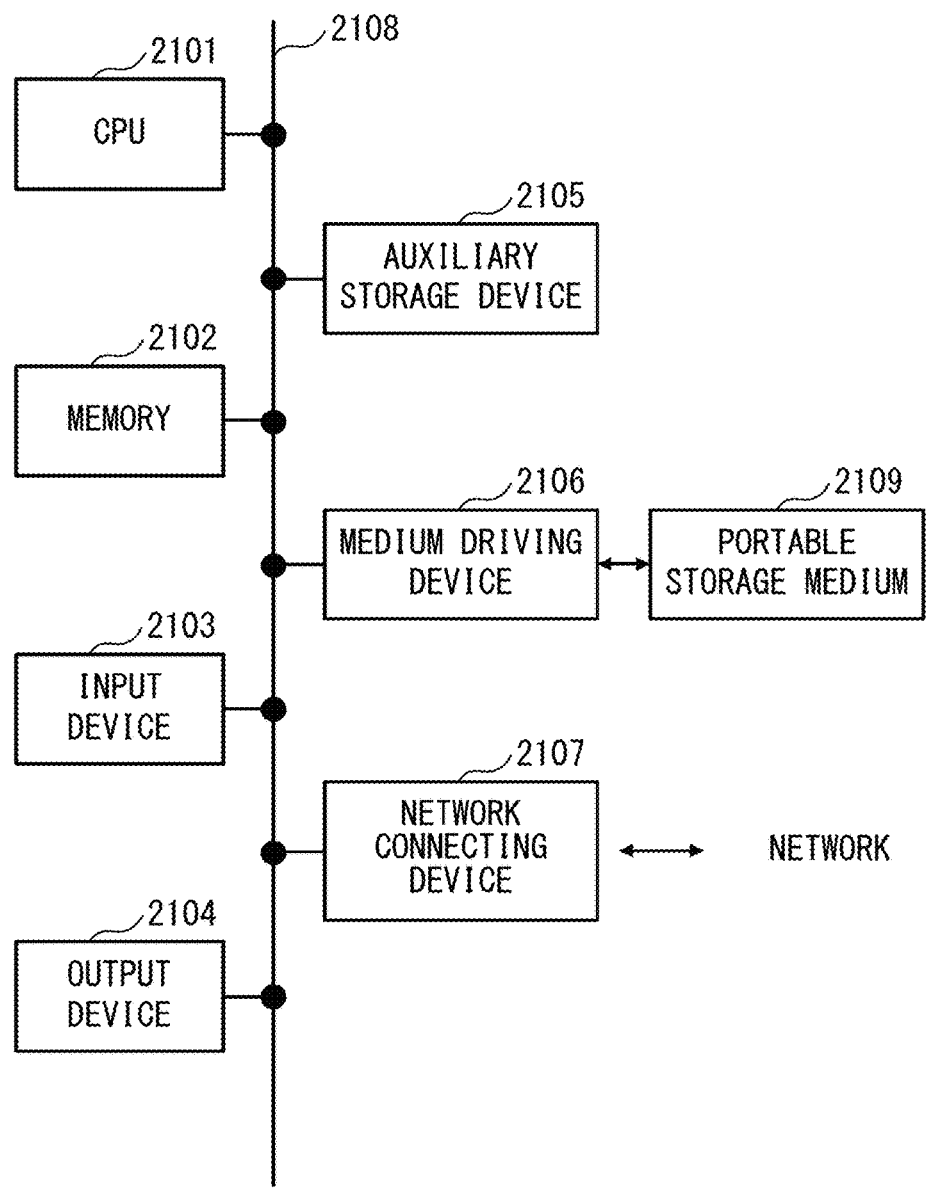
FIG. 21 is a hardware block diagram of an information processing device.

The information embedding device 101 in FIG. 1 and the information detecting device 301 in FIG. 3 can be realized by using the information processing device (computer) as illustrated in FIG. 21, for example.

The information processing device in FIG. 21 is provided with a CPU 2101, a memory 2102, an input device 2103, an output device 2104, an auxiliary storage device 2105, a medium driving device 2106, and a network connecting device 2107. These elements are connected with each other through a bus 2108.

The memory 2102 is, for example, a semiconductor memory such as Read Only Memory (ROM), Random Access Memory (RAM), or a flash memory, and stores a program and data used for processing. The memory 2102 can be used as a storage unit 111 in FIG. 1 or a storage unit 311 in FIG. 3.

The CPU 2101 (processor) executes the program by using the memory 2102 so as to operate as a generator 112 and a superimposing unit 113 in FIG. 1, or a divider 312, an analyzer 313, and an identifying unit 314 in FIG. 3. The CPU 2101 also operates as a pattern generating unit 1001 and a combining unit 1002 in FIGS. 10 and 17.

The input device 2103 is, for example, a keyboard or pointing device, and is used for inputting the instructions or information from an operators or a user. The output device 2104 is, for example, a display device, printer, or speaker, and is used for outputting the inquiries or instructions to the operator or user and the results of processing.

The auxiliary storage device 2105 is, for example, a magnetic disk device, optical disk device, magneto-optical disk device, or tape device. The auxiliary storage device 2105 may be a hard disk drive or flash memory. The information processing device stores the program and data in the auxiliary storage device 2105 so as to load them into the memory 2102 and use them. The auxiliary storage device 2105 can be used as a storage unit 111 in FIG. 1 or a storage unit 311 in FIG. 3.

The medium driving device 2106 drives a portable storage medium 2109 so as to access the stored content. The portable storage medium 2109 is, for example, a memory device, flexible disk, optical disc, or magneto-optical disk. The portable storage medium 2109 may be, for example, Compact Disk Read Only Memory (CD-ROM), Digital Versatile Disk (DVD), or a Universal Serial Bus (USB) memory. The Operator or user can store the program and data in the portable storage medium so as to load them into the memory 2102 and use them.

As described above, a computer-readable recording medium is a physical (non-transitory) recording medium such as the memory 2102, the auxiliary storage device 2105, or the portable storage medium 2109.

The network connecting device 2107 is a communication interface connected with a communication network such as a Local Area Network or Wide Area Network, which makes data conversion associated with communication. The information processing device can receive the program and data from an external device through the network connecting device 2107 so as to load them into the memory 2102 and use them. The network connecting device 2107 can be used as an output unit 114 in FIG. 1.

The information processing device does not necessarily include all the elements in FIG. 21, and some of the elements can be omitted according to applications or conditions. For example, if the input of the instructions or information from the operator or user is not needed, the input device may be omitted. If the output of the inquiries or instructions to the operator or user and the results of processing is not needed, the output device 2104 may be omitted. If the portable storage medium 2109 is not used, the medium driving device 2106 may be omitted.

If the information processing device is used as an information detecting device 301, it may include an imaging device such as a camera as an element. If the information detecting device 301 is a portable terminal such as a smartphone equipped with a call function, it may include a device for calling, such as a microphone and a speaker, as an element.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information detecting device comprising:
   a memory which stores first video information wherein a range including a display screen displaying second video information on which temporally-varying embedded information is superimposed is imaged, the embedded information representing a temporally-varying statistical value of a plurality of pixel values in an image included in the second video information; and
   a processor which divides an image included in the first video information into a plurality of areas, analyzes a temporal variation of a feature amount in at least one or more areas of the plurality of areas so as to detect the embedded information from the one or more areas, and identifies an image part at least corresponding to an edge of the display screen within the image on the basis of a position of the one or more areas.

2. The information detecting device according to claim 1, wherein
   the embedded information is information varying temporally at a prescribed frequency, and
   the processor performs frequency analysis in a time direction with respect to the feature amount so as to detect the embedded information from the one or more areas.

3. The information detecting device according to claim 1, wherein
   the embedded information is generated by combining a plurality of information including at least first information varying temporally at a first frequency and second information varying temporally at a second frequency, and
   the processor performs frequency analysis in a time direction with respect to the feature amount so as to detect the embedded information from the one or more areas.

4. The information detecting device according to claim 1, wherein
the embedded information includes at least first information varying temporally at a first frequency and second information varying temporally at a second frequency,
the first information is superimposed on a first video part in the second video information,
the second information is superimposed on a second video part in the second video information, and
the processor performs frequency analysis in a time direction with respect to the feature amount so as to detect the first information from the one or more areas and the second information from one or more areas different from the one or more areas.

5. An information detecting method comprising:
dividing into a plurality of areas an image included in first video information wherein a range including a display screen displaying second video information on which temporally-varying embedded information is superimposed is imaged, the embedded information representing a temporally-varying statistical value of a plurality of pixel values in an image included in the second video information;
analyzing a temporal variation of a feature amount by a processor in at least one or more areas of the plurality of areas so as to detect the embedded information from the one or more areas; and
identifying an image part at least corresponding to an edge of the display screen within the image on the basis of a position of the one or more areas.

* * * * *